(12) United States Patent
Nelson et al.

(10) Patent No.: US 6,857,057 B2
(45) Date of Patent: Feb. 15, 2005

(54) VIRTUAL STORAGE SYSTEMS AND VIRTUAL STORAGE SYSTEM OPERATIONAL METHODS

(75) Inventors: Lee L. Nelson, Boise, ID (US); Rodger Daniels, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 10/264,661

(22) Filed: Oct. 3, 2002

(65) Prior Publication Data

US 2004/0068637 A1 Apr. 8, 2004

(51) Int. Cl.$^7$ .......................... G06F 12/00; G06F 12/08
(52) U.S. Cl. .......................... 711/203; 711/6; 711/162; 711/203; 711/206
(58) Field of Search .......................... 711/6, 162, 203, 711/206

(56) References Cited

U.S. PATENT DOCUMENTS

5,392,244 A    2/1995   Jacobson

OTHER PUBLICATIONS

HP Executive Summary "Virtualization, Simplification, and Storage"; www.hp.com; Nov. 2001; pps. 1–9.
"Cassini FAQs, Snapshot"; Revision 1; Hewlett–Packard Company; May 2000; pps. 1–6.
"Business Copy Virtual Array Integration Guide", "Data Replication and Backup for the HP VA 7000 Series"; Revision Level 1.1; Hewlett–Packard Company; Jul. 2001; pps ii–iv and 1–14.
U.S. patent appn. filed Oct. 3, 2002, titled "Virtual Storage Systems and Virtual Storage System Operational Methods", by Rodger Daniels and Lee L. Nelson.
U.S. patent appn. filed Oct. 3, 2002, titled "Virtual Storage Systems, Virtual Storage Methods and Methods for Over Committing a Virtual RAID Storage System", by MIchael Brent Jacobson and Lee L. Nelson.
U.S. patent appn. filed Oct. 3, 2002, titled "Computer Systems, Virtual Storage Systems and Virtual Storage System Operation Methods", by Michael Brent Jacobson and Lee L. Nelson.
U.S. patent appn. filed Oct. 3, 2002, titled "Method of Managing a Data Storage Array, and a Computer System Including a RAID Controller", by David Umberger and Guillermo Navarro.
U.S. patent appn. filed Oct. 3, 2002, titled "Managing a Data Storage Array, A Data Storage System, and a RAID Controller", by David Umberger, Guillermo Navarro, and Rodger Daniels.
HP Virtual Array Technology; "Virtual Storage Technology Extends the Capabilities of Fault–Tolerant Storage Subsystems"; www.hp.com; Nov., 2001; pps. 1–9.

*Primary Examiner*—Mano Padmanabhan
*Assistant Examiner*—Midys Inoa

(57) ABSTRACT

Virtual storage systems and virtual storage system operational methods are described. According to one aspect, a virtual storage system includes a virtual storage space including a plurality of virtual storage locations, a physical storage space including a plurality of physical storage locations configured to store data, a memory configured to store a plurality of activated pointers which associate a plurality of virtual storage locations with a plurality of the physical storage locations, and a controller configured to deactivate at least some of the activated pointers including extracting the deactivated pointers from the memory, to access a request pertaining to selected data associated with at least one of the deactivated pointers, to activate the deactivated pointers including providing the deactivated pointers in the memory providing reactivated pointers, and to modify at least one of the reactivated pointers responsive to the request.

37 Claims, 5 Drawing Sheets

VIRTUAL STORAGE SYSTEMS AND VIRTUAL STORAGE SYSTEM OPERATIONAL METHODS

FIELD OF THE INVENTION

The invention relates to virtual storage systems and virtual storage system operational methods.

BACKGROUND OF THE INVENTION

Computer systems including hardware, software, firmware etc. have continued to experience expansive growth and sophistication in recent years. Peripherals and other components arranged to interface with computer systems have also experienced expansive growth and improvements.

In addition, computer systems are generally used in an increasing number of applications especially with the advancements made in networking solutions enabling communication between remotely spaced computers. For example, computer systems may be utilized in client applications, server applications as well as stand-alone personal computing applications.

With the increased processing speeds of computer systems, and the increasing usage of computer systems in new and varied applications, devices are desired to assist with storing and quickly accessing data processed and used by computer systems. Mass storage devices have been developed to handle large amounts of digital data utilized by computer systems. Redundant storage systems have been developed to provide continued, correct operations during the presence of a fault or other failure in a component or peripheral of a computer system. More specifically, three primary design criteria are typically considered when developing mass storage devices and include cost (low cost per unit of data storage), high input/output performance, and availability (ability to recover data even though some components have failed and to insure continued operation). Redundant array of independent disk (RAID) systems have been utilized to provide redundant storage of relatively large amounts of data.

As described below, aspects of the present invention provide improved systems and methodologies for storing data within a storage system.

DETAILED DESCRIPTION OF THE INVENTION

Figure 1:
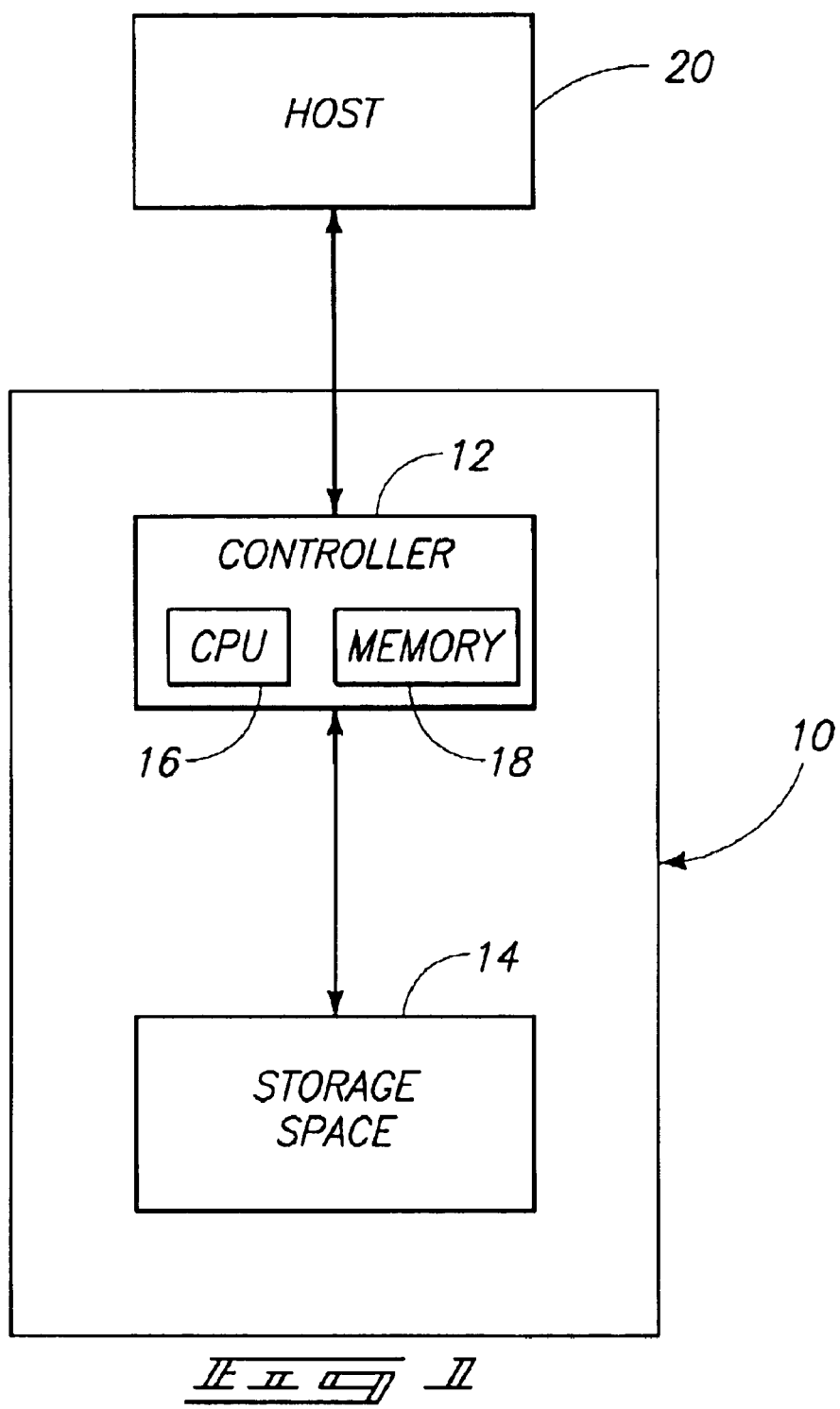
FIG. 1 is a functional block diagram of an exemplary storage system.

Attention is directed to the following commonly assigned applications, which were filed the same day as the present application and are incorporated herein by reference:

U.S. Patent Application Attorney Docket 100110704-1 (HE12-198) entitled "A System for Managing a Data Storage Array, a Method of Managing a Data Storage System, and a RAID Controller," by inventors David Umberger, Guillermo Navarro and Rodger Daniels; U.S. Patent Application Attorney Docket 100110705-1 (HE12-199) entitled "Method of Managing a Data Storage Array, and a Computer System Including a RAID Controller," by inventors David Umberger and Guillermo Navarro; U.S. Patent Application Attorney Docket 100110839-1 (HE12-200) entitled "Computer Systems, Virtual Storage Systems and Virtual Storage System Operational Methods," by inventors Michael B. Jacobson and Lee L. Nelson; U.S. Patent Application Attorney Docket 100110845-1 (HE12-201) entitled "Virtual Storage Systems, Virtual Storage Methods and Methods of Over Committing a Virtual RAID Storage System," by inventors Michael B. Jacobson and Lee L. Nelson; and U.S. Patent Application Attorney Docket 100110938-1 (HE12-202) entitled "Virtual Storage Systems and Virtual Storage System Operational Methods," by inventors Rodger Daniels and Lee L. Nelson.

According to one aspect, a virtual storage system comprises a virtual storage space including a plurality of virtual storage locations, a physical storage space including a plurality of physical storage locations configured to store data, a memory configured to store a plurality of activated pointers which associate a plurality of virtual storage locations with a plurality of the physical storage locations, and a controller configured to deactivate at least some of the activated pointers including extracting the deactivated pointers from the memory, to access a request pertaining to selected data associated with at least one of the deactivated pointers, to activate the deactivated pointers including providing the deactivated pointers in the memory providing reactivated pointers, and to modify at least one of the reactivated pointers responsive to the request.

According to another aspect, a virtual storage system comprises physical storage means configured to store data at a plurality of physical storage locations, virtual storage means adapted to provide a representation of the physical storage means to a host using a plurality of virtual storage locations; mapping means configured to associate a plurality of the virtual storage locations with a plurality of the physical storage locations, controller means configured to utilize the mapping means to access the physical storage locations, to deactivate a portion of the mapping means at an initial moment in time wherein the portion of the mapping means is not utilized to access the physical storage locations, and to activate the portion of the mapping means at a subsequent moment in time, and wherein the controller means is further configured to access a request pertaining to selected data corresponding to the portion of the mapping means, to control storage of an identifier associated with the request, to update the portion of the mapping means using the identifier after the storage, and to utilize the portion of the mapping means to access the physical storage locations after the updating.

According to yet another aspect, a virtual storage system operational method comprises providing a virtual storage space including a plurality of virtual storage locations, providing a physical storage space including a plurality of physical storage locations configured to store data, and providing a memory comprising a mapping system for associating respective ones of the virtual storage locations with respective ones of the physical storage locations, extracting at least a portion of the mapping system from the memory, providing a request affecting selected data corresponding to the extracted portion of the mapping system, storing an identifier associated with the request, and updating a portion of the extracted portion of the mapping system to identify the selected data using the stored identifier.

Referring to FIG. 1, an exemplary arrangement of a data storage system is depicted as reference number 10. According to aspects of the invention, storage system 10 is embodied as a virtual storage system. In one arrangement, storage system 10 is a virtual array (RAID) storage system having abstract addressing or mapping between a virtual storage space and physical storage space as described in further detail below. Virtual storage system arrangements differ from conventional disk array constructions which utilize mathematical functions to provide literal addressing which are fixed to blocks of physical storage space wherein a given address corresponds to a known physical block. Virtual storage systems implement adaptive, dynamic and arbitrary addressing enabling increased flexibility compared with conventional arrangements. For example, a plurality of virtual storage addresses of virtual storage space may be utilized to address a single physical storage location of physical storage space. In such a virtual storage system arrangement, point in time copies of data, also referred to as snapshot volumes of data, may be created which may result in over commitment of a virtual storage system as divergence of data occurs. Virtual storage system arrangements provide increased apparent capacity and flexibility compared with conventional constructions.

Storage system 10 arranged as a virtual storage configuration utilizes linear addressing space according to a Small Computer System Interface (SCSI) command set in one exemplary configuration. Although the presentation of storage system 10 to a host 20 may be consistent at different moments in time, a mapping system of a virtual storage system arrangement may change to accommodate demands or requirements of the storage system. Exemplary details regarding a virtual storage system are discussed in U.S. Pat. No. 5,392,244 to Jacobson et al., the teachings of which are incorporated herein by reference. Further details and aspects of virtual array technology are described in HP Virtual Array Technology, 2001 and Executive Summary: Virtualization, Simplification and Storage, November 2001, both available from www.hp.com, and the teachings of which are incorporated herein by reference.

Still referring to FIG. 1, storage system 10 in the exemplary described arrangement includes a controller 12 and storage space 14 arranged to store data. Storage system 10 in the illustrated application is configured to interface with host 20. Storage system 10 is arranged to store data received from host 20 as well as provide requested data to host 20. Host 20 may be implemented as a workstation, personal computer, server, network of computer devices, or other appropriate computer structure utilizing a separate data storage system.

In the illustrated configuration, controller 12 is arranged to implement interfacing operations with respect to host 20 including handling of input/output (I/O) requests. In addition, controller 12 provides management of storage space 14 including addressing of storage space 14 and implementing storage of data therein. As described below in one exemplary configuration, controller 12 is arranged to create a virtual storage space representation of physical storage space and a mapping system to provide addressing therebetween.

In the depicted exemplary arrangement, controller 12 includes a central processing unit (CPU) 16 and memory 18. An exemplary central processing unit is a PowerPC 440 or 8240 available from Motorola, Inc.

Controller 12 of storage system 10 may be configured to implement AutoRAID operations as discussed in the '244 patent discussed above. Controller 12 implementing AutoRAID operations may monitor use of data stored within system 10 and determine a best RAID level for the data. For example, infrequently written data is stored in RAID 5DP providing storage efficiency while frequently written data may be stored in RAID 1+0 providing optimum performance. Data may be moved between RAID levels depending upon the age of the data, frequency of accessing the data, corruption of a physical disk, and other factors. For example, controller 12 may create more storage space by moving RAID1-backed data to RAID6 areas. If a disk malfunctions or disappears, the controller 12 may move data to new locations in order to restore as much redundancy as possible. Old data may be moved from RAID1 areas to RAID6 areas. In addition, data may be moved for other reasons.

Memory 18 may be utilized to store maps as described further below for use in addressing storage space 14, to store executable code usable by controller 12, and to provide a cache for temporarily storing data. Memory 18 may be implemented as random access memory (RAM) and include a plurality of separate memory areas for storing executable code, maps, and cache in one embodiment.

Figure 2:
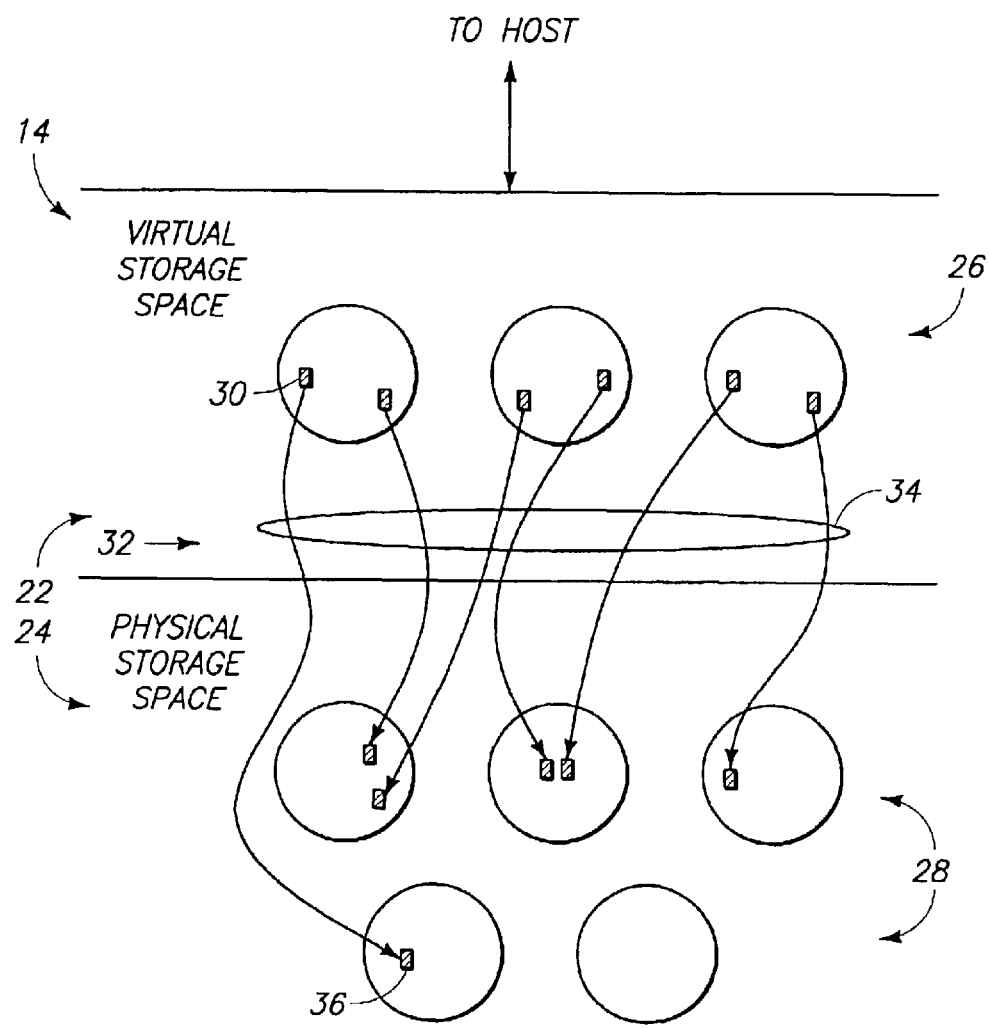
FIG. 2 is an illustrative representation of the storage system of FIG. 1 implemented as an exemplary virtual storage system.

Referring to FIG. 2, an illustrative representation of storage space 14 of system 10 is shown. Storage space 14 includes a virtual storage space 22 and a physical storage space 24 according to an exemplary virtual storage architecture of the described system 10. Virtual storage space 22 includes a plurality of virtual storage volumes 26 and physical storage space 24 includes a plurality of physical storage volumes 28. The depicted number of volumes 26, 28 is exemplary and more or less volumes 26 or volumes 28 may be utilized in a given application.

Virtual storage volumes 26 may be referred to as logical unit numbers (LUNs), logical volumes or logical drives. Virtual storage space 22 including virtual storage volumes 26 provide a convenient representation of storage capacity to host 20. Host 20 may utilize a SCSI command set to implement addressing of storage space 14 including virtual storage volumes 26. Host 20 may implement a logical volume manager, such as LVM software for use in an HP-UX operating system and available from Hewlett-Packard Company, to provide centralized management of storage system 10. For example, a logical volume manager may provide a virtualization of data storage of storage system 10 within host 20 for use in interfacing storage system 10 with host applications. Management features of system 10 may appear in a plurality of software management interfaces: SCSI command set, Virtual Front Panel (VFP), Graphical User Interface (GUI), Command Line User Interface (CLUI), Application Programming Interface (API), etc. for use in various solutions integrations.

Physical storage volumes 28 may comprise an array of disks individually configured to provide actual storage digital data (i.e., no data is stored using virtual storage space in the described configuration). In one aspect, controller 12 controls storage of data using volumes 28 according to desired RAID levels. The number of volumes 28 may be tailored to the particular implementation of system 10.

Virtual storage space 22 provides an abstract representation of physical storage space 24 to host 20. Virtual storage space 22 may be modified as desired by controller 12 or host 20. For example, virtual storage space 22 may be tailored to represent physical storage space 24 in a format which may be conveniently accessed by host 20. In turn, a logical volume manager of host 20 may provide yet another virtual abstraction of virtual storage space 22 (not shown) in a format which may be conveniently utilized by host applications.

Virtual storage space 22 of system 10 includes a plurality of addresses or storage locations 30. The depicted exemplary physical storage space 24 includes a plurality of addresses or storage locations 36. Addresses 30 of virtual storage space 22 are utilized to provide addressing of addresses 36 of physical storage space 24 wherein data is stored.

For example, in one embodiment, controller 12 operates to create and implement a mapping system 32 comprising a plurality of pointers 34 to access physical storage locations 36. Pointers 34 of mapping system 32 may be stored within memory 18 to implement addressing to associate a plurality of respective addresses or locations 30 of virtual storage space 22 with respective addresses or locations 36 of physical storage space 24.

Host 20 may read or write data with respect to system 10 by submitting requests. Such requests may address a storage location 30 of virtual storage volumes 26. A request received from host 20 identifying a virtual storage location 30 has an associated pointer 34 which identifies the respective physical storage location 36 which contains the actual data to be read by host 20, or written to by host 20, as indicated in the request identifying the virtual storage location 30.

Individual virtual storage locations 30 may represent a common predefined amount of data at physical storage locations 36 in the described implementation. For example, virtual storage locations 30 may refer to clusters including 512 blocks which individually include 512 bytes of data in one exemplary arrangement. Accordingly, a virtual storage location 30 refers to a cluster size piece of data of a respective physical storage location 36 including 512 blocks individually comprising 512 bytes of data providing a total of 256 Kbytes of data per physical storage address or location 36 in one embodiment.

Storage system 10 arranged according to a virtual storage architecture is able to implement operations not capable in conventional RAID systems. For example, controller 12 may create a virtual copy of a storage volume 26 by duplicating the pointers of the original volume 26 being copied rather than duplicating the data itself. Such duplication of pointers may be referred to as providing a point in time copy or a snapshot volume of a virtual storage volume 26.

Figure 3:
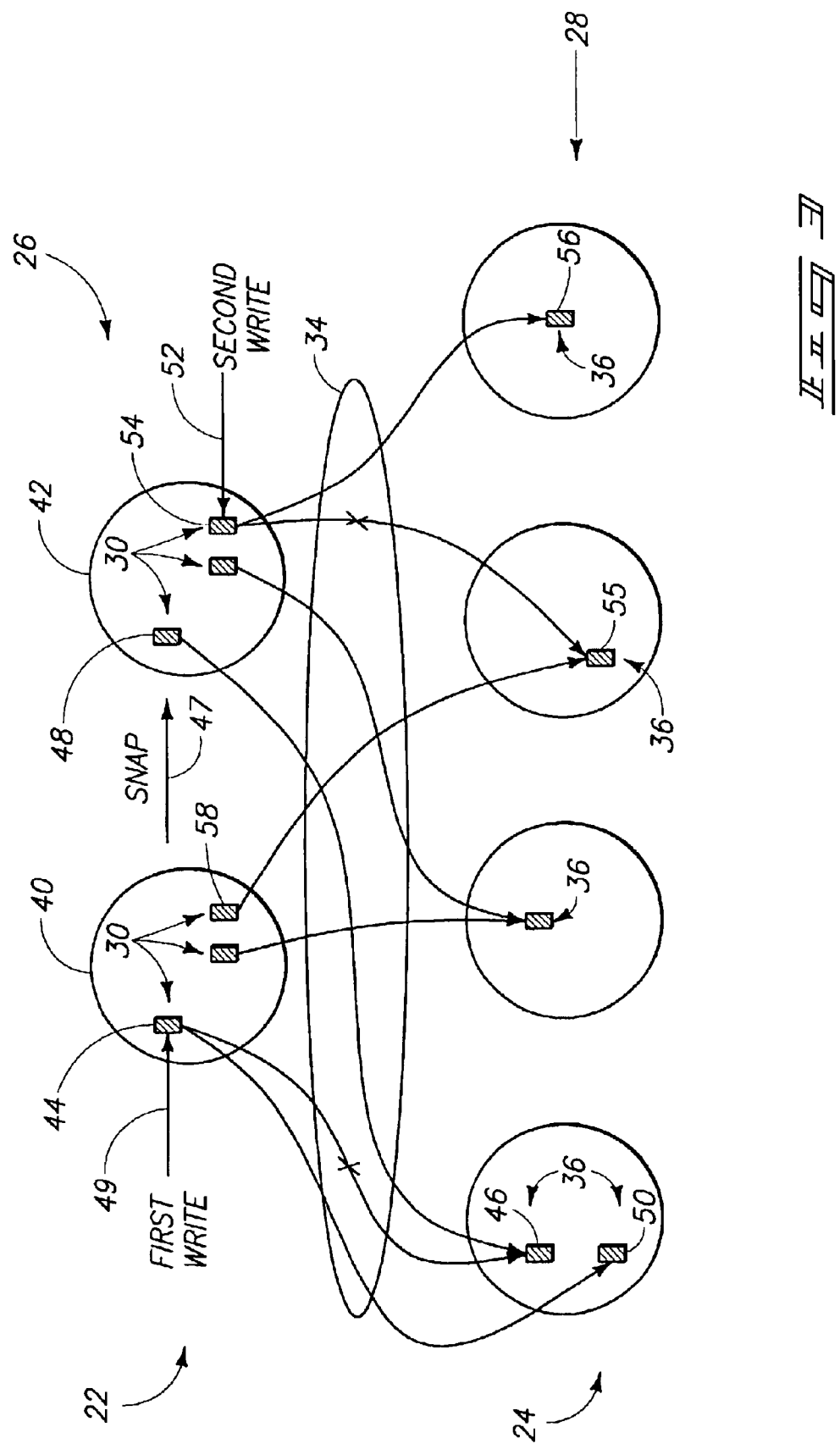
FIG. 3 is an illustrative representation of a snapshot operation of the exemplary virtual storage system.

Referring to FIG. 3, additional details of exemplary point in time copy or snapshot operations are described. A plurality of virtual storage volumes 26 and physical storage volumes 28 are shown in FIG. 3. A first virtual storage volume 40 may be referred to as a parent or original volume while a second virtual storage volume 42 may be referred to as a snapshot volume 42. Snapshot operations may be performed to create a new snapshot volume or to refresh an existing snapshot volume to provide a snapshot of the original volume.

In the depicted example, original volume 40 includes a plurality of respective pointers 34 at a given moment in time which map virtual storage locations 30 to physical storage locations 36. During a snapshot operation, controller 12 creates another virtual storage volume 42 (also referred to as a snapshot volume) of the original volume 40. In one embodiment, controller 12 copies the associated pointers 34 of volume 40 and creates volume 42 including the same pointers 34 pointing to the same physical storage locations 36 as original volume 40 at the moment in time when volume 40 is snapped. In another arrangement described below, snapshot volume 42 may include pointers 34 corresponding to pointers 34 of volume 40 but which have dummy addresses of physical storage space 24 and rely upon addresses 36 from pointers 34 of volume 40 to address data.

When first created, snapshot volume 42 shares all of its associated physical storage space 28 with original volume 40. Thereafter, data of either the snapshot volume 42 or the original volume 40 may be updated responsive to operations from host 20 or internal operations of controller 12. When an update occurs, new physical storage space is allocated to hold the new/modified data. The corresponding pointer(s) 34 for the new/modified data of either the snapshot volume 42 or the original volume 40 (i.e., the volume that received the new/modified data) are modified to point to the new or modified physical storage address 36 storing the new data while the corresponding respective pointer(s) 34 of the unmodified data point to the same or original address(s) 36 to preserve the snapped data. The provision of new pointers for the new modified data process is called divergence. Space that has diverged is no longer shared between snapshot volume 42 and original volume 40.

For example, as shown in FIG. 3, a virtual storage location 44 initially addresses a physical storage location 46. Accordingly, following a snapshot operation 47 of original volume 40, a respective virtual storage location 48 of snapshot volume 42 also addresses physical storage location 46. Thereafter, assume a first write operation 49 occurs to virtual storage location 44. Data is retrieved from physical storage location 46, modified by the first write operation, and stored as diverged data in a new physical storage location 50. The pointer 34 associated with virtual storage location 44 becomes a divergence pointer to address physical storage location 50 following the first write operation 49. However, a pointer 34 of virtual storage location 48 of snapshot volume 42 still addresses physical storage location 46 providing access to the unmodified original data which was snapped.

Updates to data of snapshot volume 42 may also occur as illustrated by the exemplary second write operation 52 to a virtual storage location 54 of snapshot volume 42. A pointer 34 previously associated with virtual storage location 54 and a corresponding physical storage location 55 is modified to now refer to a new physical storage location 56 following the second write operation and including the modified data which was previously stored as physical storage location 55. A pointer 34 associated with a virtual storage location 58 of original volume 40 still addresses physical storage location 55 following the second write operation.

Since a snapshot volume does not consume additional physical storage space at the moment in time the parent volume is snapped, it is possible to configure a snapshot volume so that available physical storage space of storage system 10 becomes exhausted as divergence occurs. System 10 permits snapshot operations even if system 10 does not have sufficient physical storage space to accommodate divergence of the resulting snapshot volume as data is modified. This state of the storage system 10 may be referred to as over committed. It may be advantageous to allow storage system 10 to become over committed because one or more snapshot volumes of system 10 may not experience complete divergence in their cycle of use. In such a case and with over commitment, storage system 10 may give an appearance that it has more storage space (represented by virtual storage space) than its available physical storage space.

Figure 4:
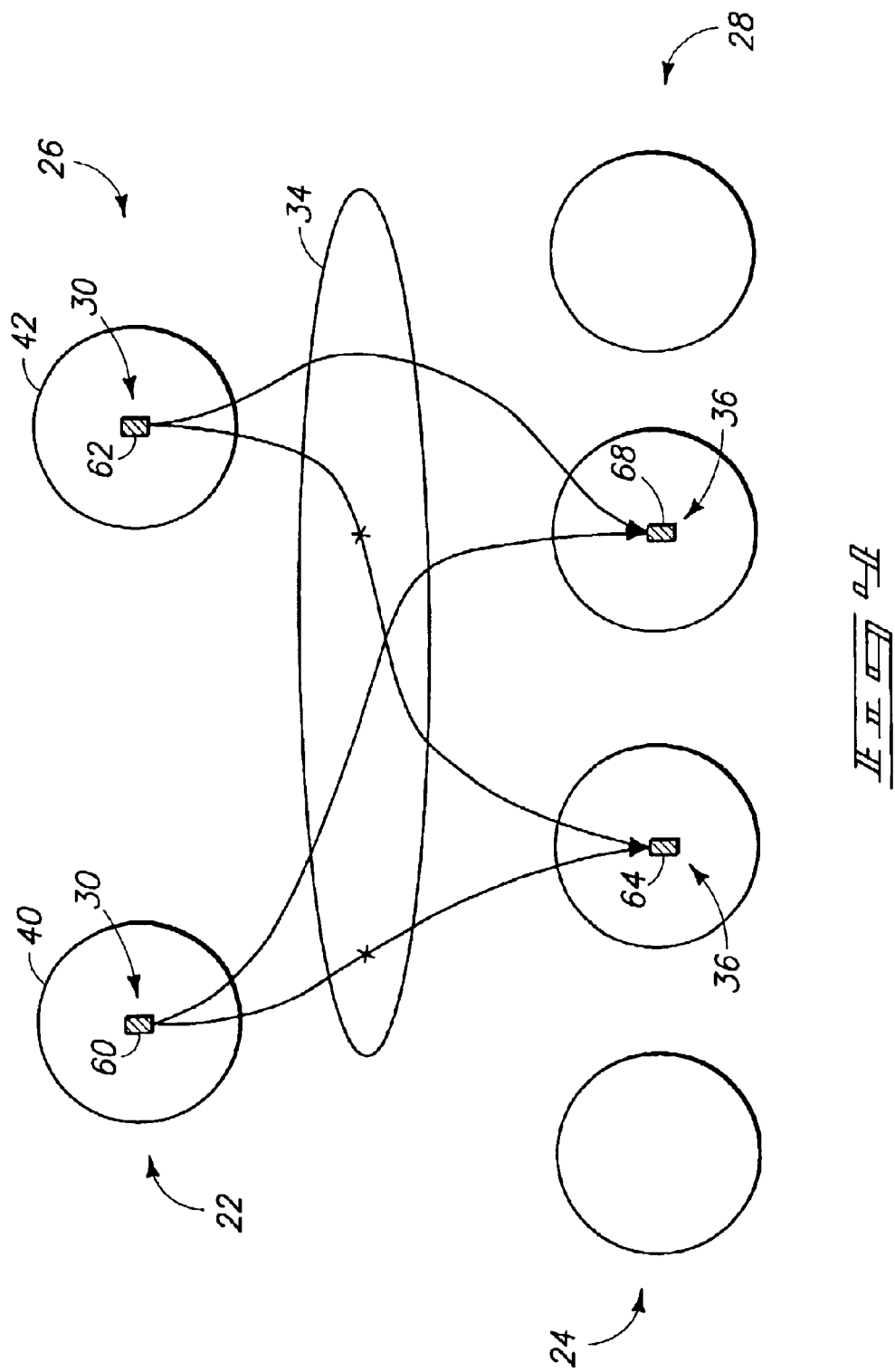
FIG. 4 is an illustrative representation of data migration of the exemplary virtual storage system.

Referring to FIG. 4, additional exemplary operations of storage system 10 are described. In particular, FIG. 4 depicts exemplary data migration operations for manipulating data within physical storage space 24. Data migration is movement of data stored in physical storage space 24 from one physical storage location 36 to another physical storage location 36. As mentioned previously, data migration may be utilized in exemplary arrangements to move data between different RAID levels depending upon the age of the data or a frequency of accessing the data, corruption of a physical disk, or for other reasons.

FIG. 4 depicts virtual storage volume 40 and snapshot volume 42 of the virtual storage volume 40 at a plurality of moments in time. For example, pointers 34 associated with virtual storage locations 60, 62 are initially associated with a physical storage location 64. At a subsequent moment in time, controller 12 moved the data from physical storage location 64 to another physical storage location 68, for example during a data migration operation. The depicted movement of data from location 64 to location 68 is exemplary to illustrate possible data migration operations. In other data migration operations, data may be moved to other locations 36 upon the same physical storage volume 28 or to a plurality of volumes 28.

The pointers 34 associated with the moved data are updated to implement correct addressing of the data at the new physical storage location 68. For example, in the exemplary arrangement, pointers 34 associated with location 64 are utilized to initially address the data within location 64. Thereafter, the pointers 34 are modified for association with location 68 to address the data within location 68 following movement of the data from location 64 to location 68.

As described in the co-pending application having docket number 100110938-1 and incorporated by reference herein, it may be desired to free portions of memory 18 (portions of memory 18 dedicated to storage of pointers 34 may also be referred to as mapping space) to accommodate additional pointers 34, to provide additional cache space, to provide other storage space, or for other reasons. Aspects of the invention provide structural arrangements and methodologies to enhance storage capabilities of memory 18 or other mapping space to accommodate additional pointers or for other reasons as described below.

According to one operational aspect, controller 12 is arranged to extract portions of mapping system 32, and pointers 34 thereof, from a mapping space (e.g., memory 18) to provide storage capacity for new pointers 34 or for other purposes. Thereafter, the extracted portions of mapping system 32 and pointers 34 may again be provided into the mapping space for use in implementing addressing intermediate virtual storage space 22 and physical storage space 24.

One embodiment provides identification of portions of mapping system 32, including the appropriate pointers 34 thereof, which may be extracted from memory 18 with minimal adverse effects upon the performance of system 10 resulting from the extraction of the portions of mapping system 32. For example, in one aspect, it is desired to extract portions of mapping system 32 which will result in minimal delays during operation of system 10 and handling of I/O requests from host 20.

Snapshot volumes described above are commonly utilized in exemplary operations for restore operations or to stream data to tape storage media. Otherwise, the data of snapshot volumes may not be accessed, modified or utilized for relatively extended periods of time. However, the generation of snapshot volumes consumes resources of memory 18 for storage of pointers 34 for the snapshot volume. Accordingly, even though a snapshot volume may not consume additional physical storage space, memory 18 is utilized in one embodiment to store the pointers 34 for the snapshot volume.

According to aspects of the invention, controller 12 may utilize criteria, including for example the type of the virtual storage volumes 26, to identify portions of mapping system 32 as candidates for deactivation. Controller 12 may utilize criteria for identifying portions of the mapping space 32 to be deactivated including for example identifying volumes which are snapshot volumes or are not regular volumes. Controller 12 is arranged to extract portions of mapping system 32 including pointers 34 from memory 18 for a snapshot or other volume according to on exemplary arrangement. Extraction of respective portions of the mapping system 32 for a virtual storage volume may be referred to as deactivating the virtual storage volume. According to exemplary described aspects, controller 12 identifies one or more virtual storage volume as candidate(s) for deactivation, and thereafter extracts the respective portions of the mapping system 32 and the pointers 34 from memory 18 corresponding to the identified volume(s) 26.

According to other aspects of the invention, controller 12 may utilize additional or other criteria for identifying appropriate virtual storage volumes 26 or portions of mapping system 32 to be deactivated. For example, controller 12 may monitor a period of dormancy for a given virtual storage volume 26 wherein there is a lack of input/output requests from a host 20 with respect to the volume 26 for a predetermined period of time. The controller 12 may use such or other criteria to specify deactivation of the virtual storage volume 26.

In one embodiment, controller 12 extracts the pointers 34 of the mapping system 32 which correspond to an identified snapshot volume or other virtual storage volume 26 from memory 18 to increase the amount of memory 18 available for other uses including storage of additional pointers 34. Controller 12 may copy or remove the pointers 34 or portions of mapping system 32 to perform the described extraction. The extracted portions of the mapping system 32 may be referred to as deactivated portions of mapping system 32. The deactivated portions of the mapping system 32 and deactivated virtual storage volume(s) 26 are not utilized to access physical storage locations while in a deactivated state according to aspects of the invention. Activated portions of mapping system 32 are utilized to implement addressing intermediate virtual storage space 22 and physical storage space 24.

In one exemplary extraction operation, controller 12 accesses a table which identifies storage objects corresponding to an identified snapshot or other volume for deactivation. Individual storage objects identify a plurality of pages of pointers 34 for the identified volume. Individual pages, also referred to as segments, have a size of 64 KB and include 16,384 pointers 34. Individual pointers 34 point to clusters having a size of 256 KB of physical storage space at a respective physical storage location 36 as mentioned previously. Accordingly, individual pages or segments address 4 GB of data within physical storage space 24 in the described exemplary embodiment. The pointers 34 are paged out or otherwise extracted from memory 18 following identification of the appropriate volume and the respective storage objects, pages and pointers 34. Accordingly, in one embodiment, pointers 34 may be extracted according to one or more page of an identified volume to be deactivated.

According to the exemplary described implementation, the extracted pointers 34 are copied to or otherwise provided within other storage locations different than an initial storage location (e.g., memory 18). For example, the extracted pointers 34 are copied to physical storage volumes 28 of physical storage space 24. Following extraction, the portions of memory 18 which stored the extracted pointers 34 are thereafter available for storage of different pointers 34 (e.g., for a new or existing different virtual storage volume 26). Accordingly, following extraction of the identified pointers 34 from memory 18, the available capacity of the mapping space of memory 18 to accommodate storage of new pointers 34 is increased. Controller 12 is arranged in such an embodiment to write new pointers 34 into memory 18 at locations of the extracted pointers 34 if desired.

At subsequent moments in time after deactivation, deactivated pointers 34 or deactivated portions of mapping system 32 (e.g., corresponding to a deactivated virtual storage volume 26) may be reactivated by controller 12 to again provide addressing of physical storage locations 36 using the reactivated pointers 32. For example, controller 12 may extract the pointers 34 for a deactivated virtual storage volume 26 from physical storage space 24 and provide such pointers 34 in memory 18 to reactivate the virtual storage volume 26 and the respective pointers 34.

Controller 12 may initiate a reactivation procedure responsive to a plurality of criteria in different arrangements. Exemplary criteria include a request for a restore operation of data of the deactivated virtual storage volume 26, for writing the data of the volume 26 to tape, or for other reasons. Another virtual storage volume 26 may be deactivated to accommodate the reactivation of a given virtual storage volume 26 and to provide adequate mapping space within memory 18.

Aspects of the present invention include systems and methods for providing improved deactivation operations of mapping system 32 and mapping pointers 34 therein. As described below, the present invention utilizes a journal in an exemplary configuration to accommodate requests (also referred to as transactions) provided with respect to selected data having corresponding pointers 34 which have been deactivated. For example, requests for divergence operations described with respect to FIG. 3 and data migration operations described with respect to FIG. 4 above are accommodated and applied to mapping system 32 to assure accessibility to selected data within physical storage space 24 having corresponding pointers 34 which have been deactivated.

Exemplary operations of the invention are described below with reference to divergence of selected data wherein the associated pointers 34 have been previously deactivated. Different procedures may be utilized to formulate a snapshot volume 42 using, for example, the exemplary snapshot operation 47 described with reference to FIG. 3. In one possible snapshot operation 47, pointers 34 of original volume 40 are copied to and utilized within snapshot volume 42 upon creation of the snapshot volume 42.

In another possible snapshot operation 47, pointers 34 associated with snapshot volume 42 are created to correspond to pointers 34 of original volume 40, however, the pointers 34 of the snapshot volume 42 are assigned dummy (e.g., null) address values upon creation which do not initially address appropriate original physical storage locations 36. If divergence occurs, the affected pointers 34 may be updated with the respective appropriate original physical storage addresses 36 to provide access to the original snapped data which has been subsequently diverged.

Aspects of the present invention include systems and methods for accommodating host requests, internally generated requests, or other requests with respect to selected data whose respective pointers 34 have been deactivated. Following deactivation, the deactivated pointers 34 are no longer within memory 18 and are provided within physical storage volumes 28 in one embodiment. Updating the deactivated pointers 34 in real time in physical storage volumes 28 responsive to received requests may result in degradation of performance and speed as relatively slow searching of the physical storage volumes 28 may be required to implement real time updates responsive to the requests. Aspects of the invention accommodate the requests to provide addressing to selected data whose pointers 34 have been deactivated at the moment of the provision or receipt of the requests while substantially maintaining the performance of system 10.

Aspects of the invention described immediately below are with respect to configurations wherein pointers 34 of mapping system 32 including the physical storage addresses 36 are copied at the time of the formation of a snapshot volume 42. Requests to the respective original volume 40 of the snapshot volume 42 which has been deactivated may be received which affect data associated with one or more deactivated pointer 34.

One exemplary request may write to selected data of physical storage locations 36 which are also addressed by deactivated pointers 34 of the respective deactivated snapshot volume 42. The received write request would result in divergence of the data. Inasmuch as the pointers 34 of the snapshot volume 42 include addresses for the physical storage locations 36 of the selected data, no change should need to be made to the respective pointers 34 to provide addressing of the original data as snapped.

Another exemplary request may be for data migration of selected data which is addressed by deactivated pointers 34 of the deactivated snapshot volume 42. Such would result in the change of the selected data from storage in a first or original physical storage location 36 to storage in a second or subsequent physical storage location 36. According to aspects of the invention, the request for data migration may be stored and applied to appropriate deactivated pointers 34 at later moments in time (e.g., upon reactivation).

For example, in one embodiment, controller 12 may generate a data migration request or the request may be received from another entity (e.g., host 20). Controller 12 determines whether the data migration request pertains to selected data associated with one or more of the deactivated pointers 34. According to aspects of the invention, controller 12 may store the migration request if the selected data is associated with one or more deactivated pointer 34 as described further below.

In one arrangement, controller 12 may store an identifier associated with and/or corresponding to the data migration request within memory 18. An exemplary identifier identifies the particular pointer 34 to be modified at a later moment in time and also includes the new physical storage address 36 (also referred to as modified address) wherein the respective selected data may be found following the indicated data migration. Thereafter (e.g., upon activation of the associated deactivated virtual storage volume 26), the controller 12 modifies the identified respective pointer 34 using the new physical storage address 36 of the identifier so that the respective pointer 34 now addresses the migrated data at the modified address 36 enabling access of the selected data via the reactivated pointer 34.

Aspects of the invention described immediately below are with respect to snapshot configurations of system 10 wherein pointers 34 of mapping system 32 including the physical storage addresses 36 are not copied at the time of the formation of a snapshot volume 42 but are accessed from the original volume 40 as necessary. As mentioned above, requests to the respective original volume 40 of the snapshot volume 42 which has been deactivated may be received which affect data associated with one or more deactivated pointer 34.

For example, if a write or other request is provided which will result in divergence of the selected data associated with the request, the respective deactivation pointer 34 of the snapshot volume 42 is modified at a later moment in time to include the original address 36 of the selected data before modification (e.g., the original data). In such a situation, controller 12 provides and stores an identifier for the request which includes the original physical storage address 36 of the snapped data to maintain access to the snapped data of the snapshot volume 42. Controller 12 may access the original address 36 from an original pointer 34 of the original volume 40 utilized to create the snapshot volume 42 prior to divergence.

Thereafter, the deactivated snapshot volume may be reactivated and the appropriate pointer 34 may be modified by controller 12 using the stored identifier and the original address 36 from the original volume 40 for accessing the selected data at the point in time the snapshot volume was created. In one example, a dummy value of the reactivated pointer 34 may be replaced by the original address 36 for the selected data of the identifier or modified to accommodate the original address 36 of the selected data such that the original snapped data of the original pointer 34 is still accessible following the request to modify the data, and the modification of the data.

For data migration requests with respect to configurations wherein pointers 34 of mapping system 32 including the physical storage addresses 36 are not copied at the time of the formation of a snapshot volume 42, modification of a deactivated pointer 34 should not be necessary in the absence of divergence inasmuch as the original address 36 of the moved data is available for updating as necessary pointers 34 of snapshot volume 42 until divergence occurs which may be accommodated in one exemplary arrangement as described above.

According to additional aspects of the invention, controller 12 may store one or more identifier within memory 18. For a given snapshot volume 42, controller 12 may create a journal identifying all of the deactivated pointers 34 to be modified or updated at later moments in time (e.g., upon activation). At the appropriate time, controller 12 may access the journal from memory 18 and apply the one or more modification to the respective pointer(s) 34 to assure access to the selected data affected by the requests.

According to other aspects of the invention, controller 12 may store identifiers in additional or other storage locations. For example, controller 12 may initially store the identifiers within memory 18 and thereafter store the identifiers within physical storage space 24. Alternatively, controller 12 may proceed to directly store the identifiers within the physical storage space 24 or other appropriate location without storage within memory 18.

For arrangements wherein identifiers are stored within memory 18, it may be desirable to copy or move the identifiers to physical storage space 24 at subsequent moments in time. For example, if a predetermined number of identifiers are detected as being stored within memory 18, controller 12 may move the identifiers to physical storage space 24 to free resources of memory 18. Thereafter, the identifiers may be accessed from physical storage space 24 and utilized to update appropriate pointers 34.

In accordance with additional aspects of the invention, updates or modifications to deactivated pointers may be made upon reactivation as described above or at other convenient moments in time. For example, controller 12 may be arranged to detect a condition, to activate the pointers 34 responsive to the detection, and to provide the modifications responsive to the detection. Alternatively, controller 12 may provide the updates to the pointers 34 still in a deactivated state. Possible conditions which may be monitored include periods of relative inactivity of system 10 (e.g., an absence of instructions from a host 20 for a predetermined period of time). Another possible condition includes monitoring for the occurrence of storage of a predetermined number of requests and/or identifiers with respect to selected data of a snapshot volume 42. Such described aspects enable tailoring of the modifying and updating to periods of time wherein demand of system 10 may be reduced.

Figure 5:
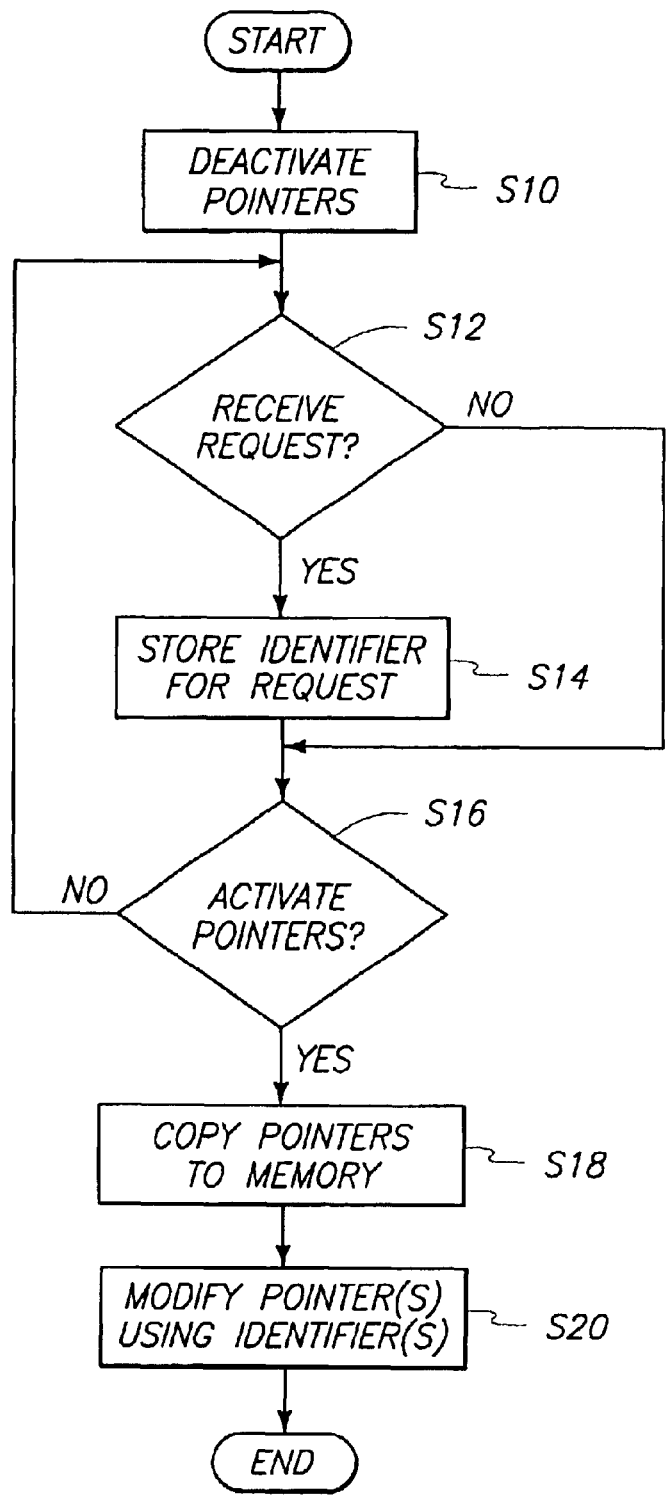
FIG. 5 is a flow chart depicting an exemplary methodology of management of a mapping system of the virtual storage system.

Referring to FIG. 5, shows an exemplary operational method executable by controller 12 to implement exemplary aspects of the invention. The depicted methodology may be embodied as executable code within memory 18 and executed by controller 12. Other methods are possible including more, less or alternative steps.

Initially at a step S10, the controller identifies and deactivates pointers of a mapping system.

At a step S12, the controller monitors for the presence of a request affecting selected data corresponding to the pointers deactivated in step S10. If the condition of step S12 is negative, the controller proceeds to a step S16.

If the condition of step S12 is affirmative, the controller proceeds to a step S14 to generate and store an identifier for a request within a journal.

At step S16, it is determined whether deactivated pointers should be reactivated. If the condition of step S16 is negative, the controller returns to step S12.

If the condition of step S16 is affirmative, the controller proceeds to a step S18 to copy the deactivated pointers into memory to reactivate the pointers.

At a step S20, the controller proceeds to access the journal including one or more stored identifier and modifies one or more activated pointer responsive to the stored one or more identifier.

Snapshot volumes described herein have numerous uses including providing backups of original volumes. It is possible for many snapshot volumes of an original volume to exist simultaneously within virtual storage system 10. Snapshot volumes could be created according to a defined interval over a period of time and individual snapshot volumes could represent a backup of the original volumes at different points or moments in time.

Snapshot volumes provide improvements with respect to traditional tape backups inasmuch as restoration of an original volume from a snapshot volume is typically much faster and less disruptive than restoring from a tape backup. In addition, creating a snapshot volume is faster and less disruptive compared with copying of an original volume to tape.

Aspects of the invention alleviate problems associated with creation of multiple snapshot volumes (e.g., of one of the original volumes) wherein significant mapping memory is utilized (i.e., individual snapshot volumes may contain the same amount of mapping memory as the original volume).

As described herein, aspects of the invention reduce the consumption of mapping memory for accommodating snapshot volumes and reduce the impact of mapping memory as a limiting factor in the creation of snapshot volumes.

Aspects of the invention avoid or reduce the chances of data corruption within snapshot or other volumes. For example, some aspects of the invention provide for the utilization of a journal to store requests, also referred to as transactions or changes. The journal entries may be applied to snapshot volumes upon reactivation and provision of the snapshot volumes in memory according to exemplary operations.

The protection sought is not to be limited to the disclosed embodiments, which are given by way of example only, but instead is to be limited only by the scope of the appended claims.

What is claimed is:

1. A virtual storage system comprising:
   a virtual storage space including a plurality of virtual storage locations;
   a physical storage space including a plurality of physical storage locations configured to store data;
   a memory configured to store a plurality of activated pointers which associate a plurality of virtual storage locations with a plurality of the physical storage locations; and
   a controller configured to deactivate at least some of the activated pointers including extracting the deactivated pointers from the memory, to access a request pertaining to selected data associated with at least one of the deactivated pointers, to activate the deactivated pointers including providing the deactivated pointers in the memory providing reactivated pointers, and to modify at least one of the reactivated pointers responsive to the request.

2. The system of claim 1 wherein the controller is configured to store an identifier associated with the request and to modify the at least one reactivated pointer using the identifier.

3. The system of claim 2 wherein the controller is configured to store the identifier comprising an original address of the selected data, and to modify the at least one reactivated pointer using the original address.

4. The system of claim 2 wherein the controller is configured to store the identifier comprising a modified address of the selected data, and to modify the at least one reactivated pointer using the modified address.

5. The system of claim 2 wherein the controller is configured to store the identifier within the memory.

6. The system of claim 5 wherein the controller is configured to extract the identifier from the memory and to provide the extracted identifier in the physical storage space.

7. The system of claim 6 wherein the controller is configured to store a plurality of identifiers within the memory corresponding to a plurality of requests, and to copy the identifiers from the memory to the physical storage space responsive to storage of a predetermined number of identifiers in the memory.

8. The system of claim 1 wherein the controller is configured to provide the deactivated pointers in the physical storage space to deactivate the at least some activated pointers.

9. The system of claim 1 wherein the virtual storage space comprises a plurality of virtual storage volumes, and the controller is configured to deactivate the at least some activated pointers corresponding to a snapshot volume of one of the virtual storage volumes.

10. The system of claim 1 wherein the controller is configured to detect a condition, and wherein the activating and the modifying are responsive to the detecting.

11. The system of claim 10 wherein the controller is configured to detect the condition comprising an absence of instructions from a host for a predetermined period of time.

12. The system of claim 10 wherein the controller is configured to detect the condition comprising a reception of a predetermined number of requests pertaining to the selected data.

13. The system of claim 1 wherein the controller is configured to access the request comprising a request to update the selected data.

14. The system of claim 1 wherein the controller is configured to access the request comprising a request to move the selected data.

15. A virtual storage system comprising:
   physical storage means configured to store data at a plurality of physical storage locations;
   virtual storage means adapted to provide a representation of the physical storage means to a host using a plurality of virtual storage locations;
   mapping means configured to associate a plurality of the virtual storage locations with a plurality of the physical storage locations;
   controller means configured to utilize the mapping means to access the physical storage locations, to deactivate a portion of the mapping means at an initial moment in time wherein the portion of the mapping means is not utilized to access the physical storage locations, and to activate the portion of the mapping means at a subsequent moment in time; and
   wherein the controller means is further configured to access a request pertaining to selected data corresponding to the portion of the mapping means, to control storage of an identifier associated with the request, to update the portion of the mapping means using the identifier after the storage, and to utilize the portion of the mapping means to access the physical storage locations after the updating.

16. The system of claim 15 wherein the mapping means comprises pointer means stored within a memory means, and the deactivation comprises extracting some of the pointer means from the memory means and the activation comprises providing the extracted pointer means into the memory means.

17. The system of claim 16 wherein the deactivation comprises providing the extracted pointer means in the physical storage means.

18. The system of claim 16 wherein the controller means is configured to control storage of the identifier within the memory means.

19. The system of claim 18 wherein the controller means is configured to control extraction of the identifier from the memory means and to control provision of the extracted identifier in the physical storage means.

20. The system of claim 15 wherein the virtual storage means comprises a plurality of virtual storage volumes, and the controller means is configured to deactivate the portion of the mapping means corresponding to one of the virtual storage volumes comprising a snapshot volume.

21. The system of claim 15 wherein the controller means is configured to control storage of the identifier comprising an original address of the selected data.

22. The system of claim 15 wherein the controller means is configured to control storage of the identifier comprising a modified address different than an original address of the selected data.

23. A virtual storage system operational method comprising:
- providing a virtual storage space including a plurality of virtual storage locations;
- providing a physical storage space including a plurality of physical storage locations configured to store data; and
- providing a memory comprising a mapping system for associating respective ones of the virtual storage locations with respective ones of the physical storage locations;
- extracting at least a portion of the mapping system from the memory;
- providing a request affecting selected data corresponding to the extracted portion of the mapping system;
- storing an identifier associated with the request; and
- updating a portion of the extracted portion of the mapping system to identify the selected data using the stored identifier.

24. The method of claim 23 further comprising providing the extracted portion of the mapping system into the memory after the storing, and the updating comprises updating after the providing the extracted portion of the mapping system into the memory.

25. The method of claim 23 wherein the updating comprises replacing a dummy value of the portion of the extracted portion of the mapping system with an original address of the selected data.

26. The method of claim 23 further comprising moving the selected data from one physical storage location to another physical storage location responsive to the providing the request and before the updating, and the updating comprises modifying a pointer of the portion of the extracted portion to point to the another physical storage location.

27. The method of claim 23 wherein the providing the physical storage space comprises providing the physical storage space comprising a plurality of hard disks, and further comprising providing the extracted portion of the mapping system in at least one of the hard disks.

28. The method of claim 23 wherein the storing comprises storing the identifier within the memory.

29. The method of claim 28 wherein the storing comprises initial storing, and the providing the physical storage space comprises providing the physical storage space comprising a plurality of hard disks, and further comprising further storing the identifier using at least one of the hard disks before the updating and after the initial storing.

30. The method of claim 23 wherein the virtual storage space comprises a plurality of virtual storage volumes, and the extracting comprises extracting at least the portion of the mapping system corresponding to one of the virtual storage volumes comprising a snapshot volume.

31. The method of claim 23 further comprising detecting a condition and wherein the updating is responsive to the detecting.

32. The method of claim 31 wherein the detecting comprises detecting an absence of instructions from a host for a predetermined period of time.

33. The method of claim 31 wherein the providing the request comprises providing a plurality of requests, and the storing comprises storing a plurality of identifiers associated with the requests, and the detecting comprises detecting storage of a predetermined number of identifiers.

34. The method of claim 23 wherein the providing the request comprises providing the request to update the selected data.

35. The method of claim 23 wherein the providing the request comprises providing the request to move the selected data.

36. The method of claim 23 wherein the storing comprises storing the identifier comprising an original address of the selected data, and the updating comprises updating using the original address.

37. The method of claim 23 wherein the storing comprises storing the identifier comprising a modified address of the selected data, and the updating comprises updating using the modified address.

* * * * *